United States Patent [19]

Lee

[11] Patent Number: 5,301,972
[45] Date of Patent: Apr. 12, 1994

[54] BICYCLE FRAME FOLDER

[76] Inventor: Gin-Chaung Lee, 1F, No. 14, Lane 107, San Jiun Street, Shuhlin, Taipei Hsien, Taiwan

[21] Appl. No.: 39,800

[22] Filed: Mar. 30, 1993

[51] Int. Cl.$^5$ .............................................. B62K 15/00
[52] U.S. Cl. ...................................... 280/278; 280/287; 403/18; 403/20; 403/81; 403/322
[58] Field of Search .................. 280/278, 287; 403/17, 403/18, 19, 20, 81, 83, 322, 325

[56]  References Cited

U.S. PATENT DOCUMENTS

| | | | |
|---|---|---|---|
| 3,722,913 | 3/1973 | Housayama | 280/278 X |
| 3,883,157 | 5/1975 | Simpkins | 280/287 |
| 4,911,458 | 3/1990 | Lin et al. | 280/287 X |

FOREIGN PATENT DOCUMENTS 3831868  6/1990  Fed. Rep. of Germany ...... 280/278

Primary Examiner—Margaret A. Focarino
Assistant Examiner—Victor E. Johnson
Attorney, Agent, or Firm—Morton J. Rosenberg; David I. Klein

[57] ABSTRACT

Disclosed is a bicycle frame folder including two pivoted folding frames, a stop block received in between the folding frames and driven by a control lever to lock the folding frames in the closed position or to unlock the folding frames for permitting them to be opened in folding up the bicycle frame tubes connected thereto, a guide screw turned to move the stop block forwards in locking the folding frames in the closed position or backwards in releasing the folding frames, the control lever having a spring supported safety hook releasably hooked on a stub retaining rod on the lower folding frame as the folding frames are closed and locked.

1 Claim, 4 Drawing Sheets

BICYCLE FRAME FOLDER

BACKGROUND OF THE INVENTION

The present invention relates to a bicycle frame folder for a folding bicycle which uses a control lever to control the opening and closing of the folder, and simultaneously to lock the folder in the closed position.

FIG. 6 illustrates a bicycle frame folder for a folding bicycle which comprises a lock device (1a) to lock the upper folding frame (2a) and the lower folding frame (3a) in the closed position. The control device (1a) comprises a straight rod (11a) and a bend (12) respectively fastened to the upper folding frame (2a) and the lower folding frame (3a) and joined by a connecting frame (13a). As the upper and lower folding frames (2a;3a) are turned toward each other and closed together, the bend (12a) is received inside the connecting frame (13a) and retained in a recessed portion (131a). The upper and lower folding frames (2a;3a) are opened by turning the connecting frame (13a) in the reversed direction. This structure of bicycle frame folder is complicated to manufacture, and therefore its manufacturing cost is relatively high. When in use, the bend (12a) may be disengaged from the recessed portion (131a) as the connecting frame (13a) is hit by an object. Further, because the control device (1a) is disposed on the outside, it will become covered with rust quickly, and the total size of the bicycle frame folder is relatively increased. If the control device becomes covered with rust, the folder will become useless.

SUMMARY OF THE INVENTION

The present invention eliminates the aforesaid drawbacks. It is therefore an object of the invention is to provide a bicycle frame folder which is safe in use. It is another object of the present invention to provide a bicycle frame folder which needs less installation space. It is still another object of the present invention to provide a bicycle frame folder which is easy and inexpensive to manufacture. According to the present invention, a stop block is received inside the upper and lower folding frames and controlled by a control lever to lock the upper and lower folding frames in the closed position. The control lever has a spring supported safety hook that hooks on a stub retaining rod on the lower folding frame, as the upper and lower folding frames are closed, to ensure the locking.

DETAILED DESCRIPTION OF THE PREFERRED EMBODIMENT

Figure 3:
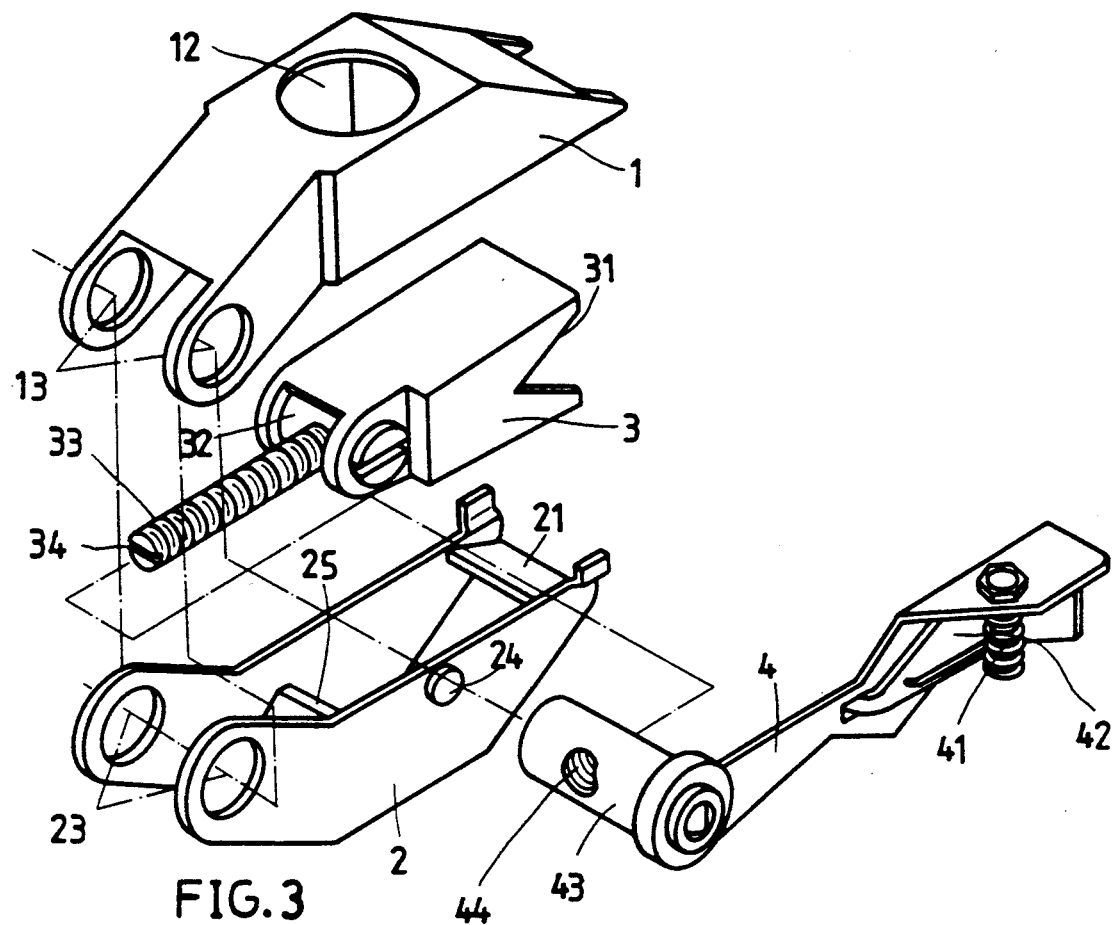
FIG. 3 is an exploded view of the bicycle frame folder of FIG. 1.
Figure 1:
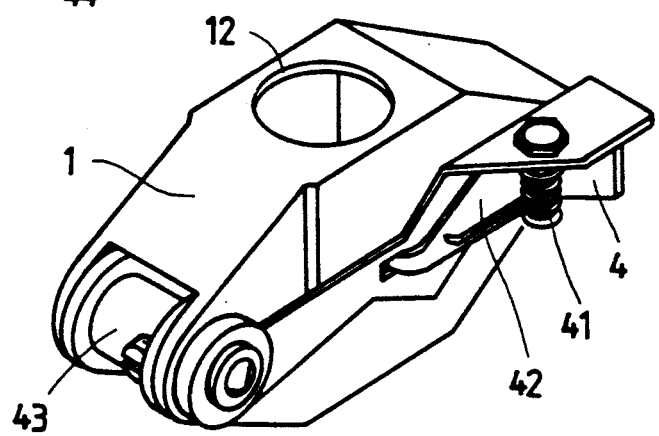
FIG. 1 is a perspective view of a bicycle frame folder constructed according to the preferred embodiment of the present invention when closed.
Figure 2:
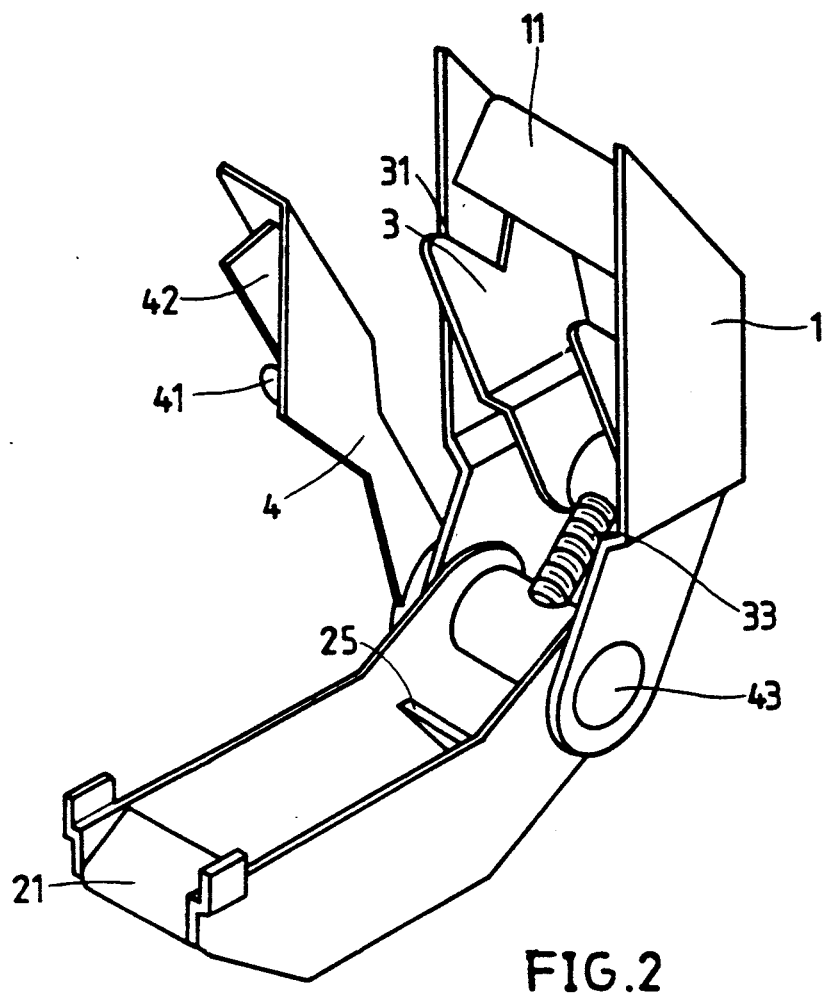
FIG. 2 is another perspective view of the bicycle frame folder of FIG. 1 when opened.

Referring to FIGS. 1, 2 and 3, a bicycle frame folder constructed according to the present invention is shown, and generally comprised of an upper folding frame 1, a lower folding frame 2, a stop block 3, and a control lever 4. The folding frame 1 or 2 comprises a hook 11 or 21 at one end, a round hole 12 or 22 in the middle, a pivot bearing 13 or 23 at an opposite end. A pivot 43 is fastened in the pivot bearings 13 and 23 to connect the upper and lower folding frames 1 and 2 together. The control lever 4 has one end fastened to one end of the pivot 43 and disposed on the outside of the folding frames 1 and 2. The stop block 3 is received inside the upper and lower folding frames 1 and 2, and coupled to a guide screw 33. The guide screw 33 has a rear end threaded into a screw hole (not shown) on an axle 32 of the stop block 31, and a slotted front end threaded into a screw hole 44 on the pivot 43. The slotted front end of the guide screw 33 has a slot 34 for driving a screw driver or like device. The stop block 3 is shaped like a swallow tail, having a triangular opening 31 on the rear end thereof into which the hooks 11 and 21 hooked as the upper and lower folding frames 1 and 2 are closed.

Figure 4:
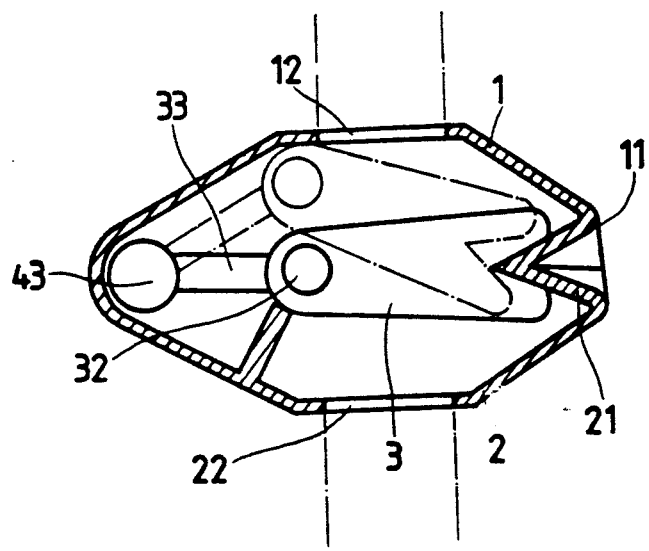
FIG. 4 is a sectional side view of the bicycle frame folder of FIG. 1 showing the two hinged parts thereof locked in the closed position by a stop device.
Figure 5:
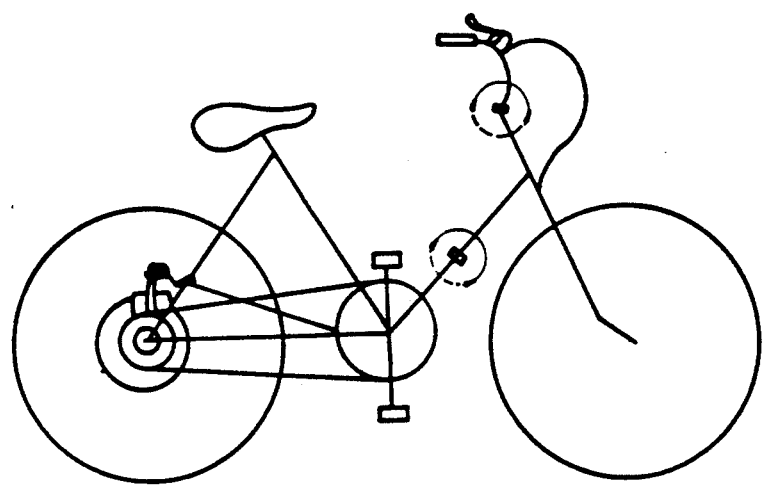
FIG. 5 is a schematic drawing showing a folding bicycle having bicycle frame folders of the present invention fastened in the frame thereof.
Figure 6:
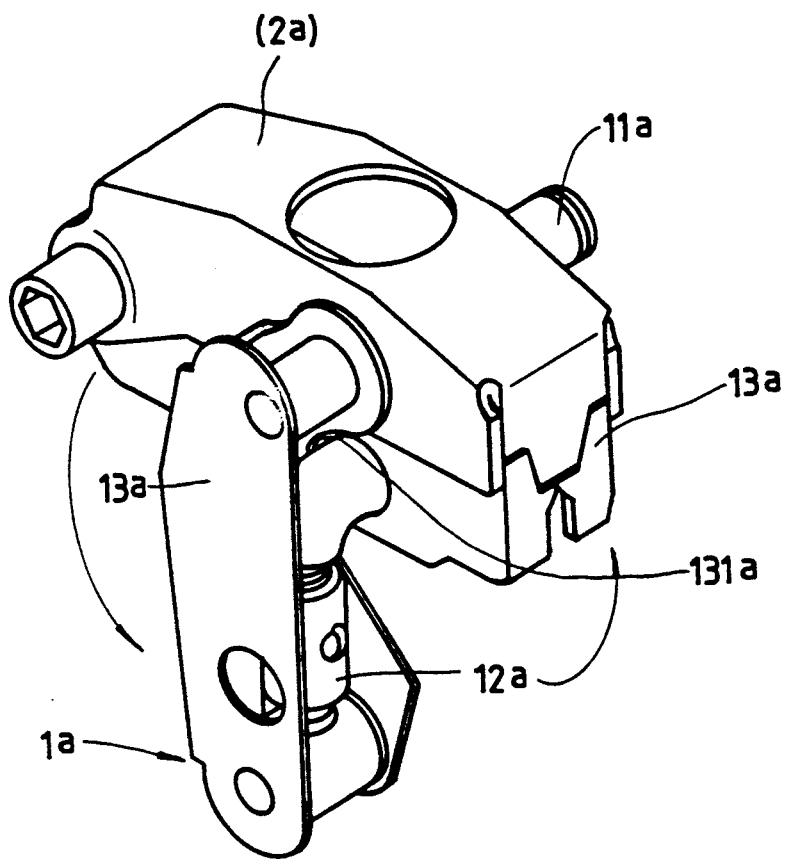
FIG. 6 is a perspective view of a bicycle frame folder constructed according to the prior art.

Referring to FIG. 4, turning the control lever 4 in one direction causes the upper and the stop block 3 to close in the lower folding frame 2. The the upper and lower folding frames 1 and 2 are closed together, the stop block 3 is received on the inside and stopped in position by a cross bar 25 on the lower folding frame 2, and the hooks 11 and 21 are forced to hook in the triangular opening 31 on the rear end of the stop block 3. The guide screw 33 is then turned inwards to tighten the engagement between the stop block 3 and the hooks 11 and 21. The safety hook 42 supported on the control lever 4 by a spring 41 is then hooked on a stub retaining rod 24 on the lower folding frame 2 on the outside to lock the the bicycle frame folder in the locked position. Opening the bicycle frame folder is easy by releasing the safety hook 42 from the stub retaining rod 24 and then turning the control lever 4 in the reversed direction to release the stop block 3 from the hooks 11 and 21. As the bicycle frame folder is opened, the two opposite bicycle frame tubes which are respectively inserted in the round hole 12 or 22 on either folding frame 1 or 2 are folded up.

Because the stop block 3 is received inside the bicycle frame folder as the bicycle frame folder is closed, it is protected against weather and dust, and therefore the service life of the bicycle frame folder is prolonged. The design of the control lever ensures the bicycle frame folder being locked in the closed position. Further, the manufacturing cost of the bicycle frame folder is less expensive because most parts are made by punching machines.

What is claimed is:

1. A bicycle frame folder comprising:
   an upper folding frame and a lower folding frame each having a respective first end pivotally connected one to the other by a pivot, each folding frame having a front hook on a second end thereof for locking in a closed position and a middle circular hole which receives a respective bicycle frame tube, said lower folding frame having a cross bar disposed on an inside surface thereof and a stub retaining rod disposed on an outside surface of said lower folding frame;

a control lever having one end thereof fastened to said pivot and driven to turn said pivot in closing and opening said upper and lower folding frames, said control lever having a safety hook supported on a spring and controlled to hook on said stub retaining rod as said upper and lower folding frames are closed;

a stop block disposed in between said upper and lower folding frames, and having a triangular opening on a rear end thereof and a front end connected to said pivot by a guide screw, said stop block being stopped at said cross bar as said upper and lower folding frames are closed, said guide screw being turned to, (1) move said stop block forward to engage with the hook on said upper folding frame and the hook on said lower folding frame as said upper and lower folding frames are closed, and (2) move said stop block backward to disengage from the hook on said upper folding frame and the hook on said lower folding frame for permitting said upper and lower folding frames to be opened.

* * * * *